March 5, 1929.  H. LEVINE  1,704,298
GEAR SET
Filed April 26, 1926   2 Sheets-Sheet 1

INVENTOR
HYMAN LEVINE.
BY
ATTORNEY

March 5, 1929. H. LEVINE 1,704,298
GEAR SET
Filed April 26, 1926 2 Sheets-Sheet 2

INVENTOR
HYMAN LEVINE.
BY
ATTORNEY

Patented Mar. 5, 1929.

1,704,298

UNITED STATES PATENT OFFICE.

HYMAN LEVINE, OF MILWAUKEE, WISCONSIN, ASSIGNOR TO THE FALK CORPORATION, OF MILWAUKEE, WISCONSIN, A CORPORATION OF WISCONSIN.

GEAR SET.

Application filed April 26, 1926. Serial No. 104,698.

This invention relates to gear sets for converting rotary motion at one speed into rotary motion at a higher or lower speed.

Such sets are built as standard units in various sizes and capacities and with various speed ratios between the driving and driven shafts, and they are sold for use in various types of installations. For each installation a gear set in selected, whose characteristics will best satisfy the particular requirements involved. These units must be capable of continuous operation at full load and at either extremely high or extremely low speeds.

These sets ordinarily comprise a housing, supporting the driving and driven shafts, and enclosing gears through which the shafts are connected. In some a single speed reduction is provided, while in others a double or triple speed reduction is provided, with an appropriate intermediate shaft or shafts between the driving and driven shafts. The housing is ordinarily made up of two or more parts, usually castings, joined along the plane, or planes of the shafts. In order to meet the severe and trying conditions to which these sets are subjected, the bearings for each shaft were heretofore separately formed in the housing, and ordinarily consisted of poured Babbitt metal.

Lubrication of the bearings was heretofore effected through cored holes in the castings. The inaccessibility of these holes rendered it impossible to insure the removal of all the molding sand therefrom, and any sand remaining would ultimately be loosened and picked up by the lubricating oil and delivered to the bearings, with consequent ill effects.

One object of the present invention is the provision in a gear set of the type mentioned of a lubricating system free from the objections above noted.

Another object is the provision in a gear set of the type mentioned of replaceable bearing units capable of withstanding the severe service to which such sets are subjected, and at the same time rendering it possible to employ standardized and consequent economical manufacturing methods.

Other objects and advantages will apear from the following description of an illustrative embodiment of the present invention.

In the drawings:—

Figure 1:
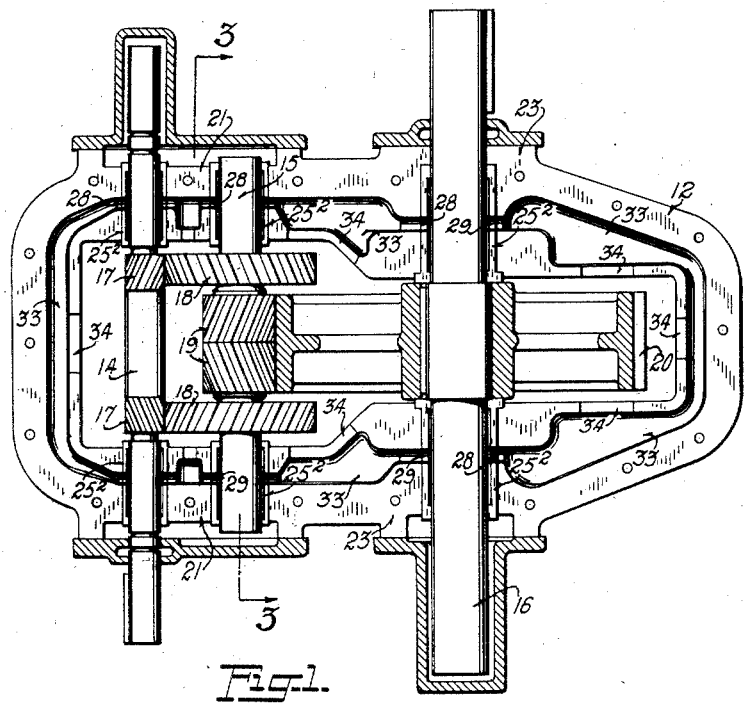
Figure 1 is a plan view of a gear set, embodying the present invention, with the cover removed.
Figure 4:
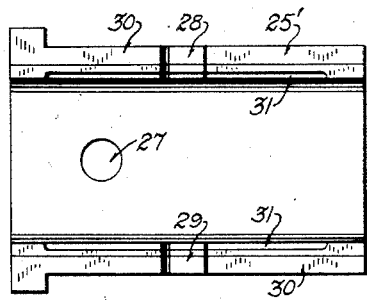
Fig. 4 is a plan view of a bearing element.
Figure 5:
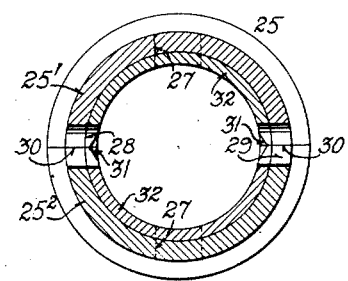
Fig. 5 is a transverse sectional view of a pair of bearing elements.

The gear set selected for illustration comprises a two-part housing including a base portion 10 and a cover portion 11. The base portion is in the form of a hollow casting, constituting an oil reservoir, and provided with a substantially horizontal, heavily flanged rim 12 forming a seat for a similarly formed rim 13 of the cover portion. In the gear set shown a high speed shaft 14, intermediate shaft 15, and low speed shaft 16 are journalled in the housing with their axes disposed substantially within the horizontal meeting plane of the rims 12 and 13. Two spaced helical pinions 17 on shaft 14 mesh with helical gears 18 on shaft 15, and a double helical gear 19 on shaft 15 meshes with a double helical gear 20 on shaft 16, so that a double speed reduction is provided between shafts 14 and 16.

Shafts 14 and 15 are supported between pairs of cooperating heavy bosses 21 and 22 formed on the opposite sides of the base and cover portions, respectively, and shaft 16 is supported between similar pairs of cooperating heavy bosses 23 and 24. Removable bearing units are provided for each shaft. Each bearing unit preferably comprises a substantially cylindrical sleeve 25 split longitudinally along a horizontal diameter into separable halves 25' and 25². Each half is seated in an appropriate semi-cylindrical seat formed in the face of one of the bosses 21, 22, 23, or 24, and retained in proper position therein by any appropriate means such as a stud 26 anchored in the boss and engaged in a perforation 27 formed in each half. Recesses 28 and 29 formed in the edges 30 of each half register with similar recesses formed in the edges of the cooperating half to thereby provide ports through which oil may be admitted to the interior of the bearing. The inner corners of these edges are beveled off, as at 31, for the major portion of their lengths, to provide longitudinal grooves through which oil may be distributed along the interior of the bearing. These bearing units are preferably of bronze or steel with a thin layer of Babbitt metal constituting an inner lining 32 therefor.

Figure 2:
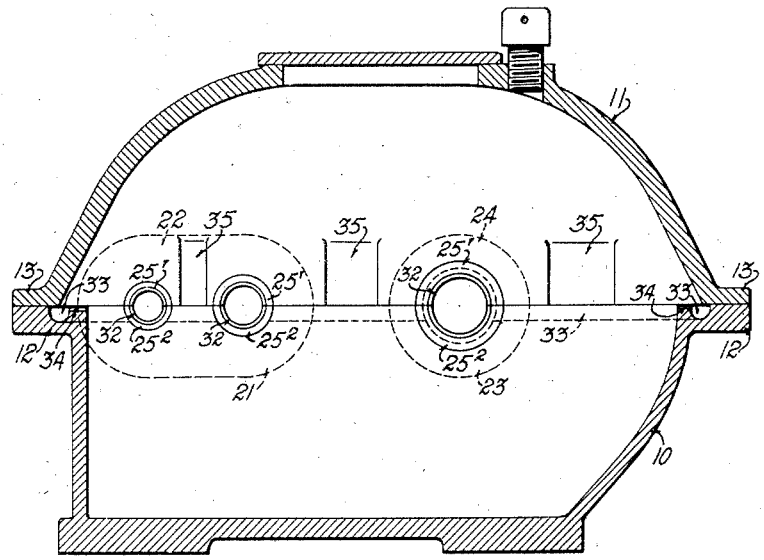
Fig. 2 is a longitudinal sectional view of the housing.
Figure 3:
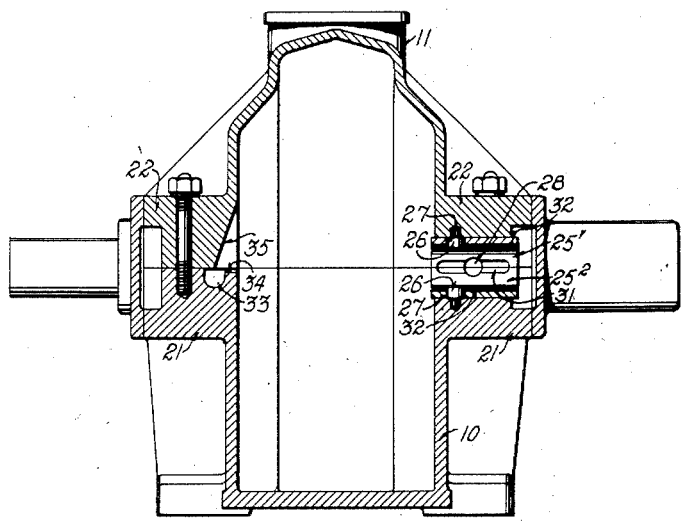
Fig. 3 is a transverse sectional view of the housing, taken substantially along the line 3—3 of Figure 1.

Oil is delivered to the several bearings by means which will now be described. An open channel 33 is formed in the face of the horizontal rim 12 of the base portion 10. In the gear set shown this channel extends completely around the housing and communicates with the interior of the several bearings through the openings 28 and 29. The cover 11 is so shaped and arranged that oil thrown from the gears against the interior walls thereof drains down into the channel 33 to maintain the channel flooded. As shown in Figure 2, the interior end walls of the cover 11 slope toward the channel 33, and, as indicated in Figures 2 and 3, the interior side walls of the cover are reduced at intervals to form inclined surfaces 35 directed toward the channel. At intervals 34 the inner rim of the channel is preferably reduced slightly below the normal face of the rim 12, so as to maintain the oil level in the channel below this face, and thereby avoid seepage of oil between the rims 12 and 13 to the exterior of the housing. It is of course understood that the channel is open to the interior of the housing so that the excess oil from the channel drains back into the base 10. This channel thus constitutes an open reservoir, fed by oil that drains from the cover, and capable of supplying oil to the bearings in sufficient quantities to insure good lubrication. It is readily accessible and thus may be easily and thoroughly cleansed.

Various changes may be made in the embodiment of the invention hereinabove specifically described without departing from the invention as defined in the appended claims.

I claim:—

1. In a gear set the combination of a housing having separable base and cover portions, shafts in said housing, gears in said housing connecting said shafts, bearings for said shafts seated between said base and cover portions, and a feed channel formed in said base portion disposed to receive oil drained from said cover portion and to direct the oil to said bearings to lubricate the same.

2. In a gear set the combination of a housing having separable base and cover portions, shafts in said housing, gears in said housing connecting said shafts, bearings for said shafts seated between said base and cover portions, and a substantially horizontal feed channel formed in said housing disposed to receive oil drained from said cover portion and to direct the oil to said bearings to lubricate the same.

3. In a gear set the combination of a housing having a base portion provided with a rim, an open channel formed in said rim, said housing having a cover portion seated on said rim and disposed to direct oil into said channel, a shaft in said housing, and a bearing for said shaft between said base and cover portions and open to said channel to receive oil therefrom.

4. In a gear set the combination of a housing having base and cover portions, a substantially horizontal rim on said base portion for receiving said cover portion, a shaft journaled between said portions, and an oil reservoir formed in said rim disposed to receive oil drained from said cover portion and to direct the same to said shaft.

5. In a gear set the combination of a housing having base and cover portions, a substantially horizontal rim on said base portion for receiving said cover portion, a channel formed in said rim for intercepting oil drained from said cover portion and to overflow into said base portion, and a shaft journaled between said base and cover portions and exposed to the oil in said channel.

6. In a gear set the combination of a housing having base and cover portions, said base portion having a relatively wide horizontal face forming a seat for said cover portion, a channel formed in said face for intercepting oil drained from said cover portion, means for maintaining a body of oil within said channel at a level below the plane of said face to thereby prevent seepage of oil between said base and cover portions, and a shaft journaled between said base and cover portions and exposed to the oil in said channel.

7. In a gear set the combination of a housing having separable base and cover portions, bearings disposed between said portions, shafts in said bearings, an oil receiving channel disposed substantially within the plane of said bearings, for supplying lubricant to said bearings and openings in said bearings communicating with said channel for admitting oil from said channel to said shafts.

8. In a gear set the combination of a housing having separable base and cover portions, shafts journalled in said housing between said portions, split bearings for said shafts, an oil reservoir formed in the joint between said base and cover portions, openings in said bearings through which oil is admitted from said reservoir, and means for releasably retaining said bearings in proper working position in said housing.

In witness whereof, I hereunto subscribe my name this 17th day of April, 1926.

HYMAN LEVINE.